United States Patent [19]

Eickmann

[11] Patent Number: 4,557,438
[45] Date of Patent: * Dec. 10, 1985

[54] HYDRAULICALLY CONTROLLED, FLUID-STREAM DRIVEN VEHICLE

[76] Inventor: Karl Eickmann, 2420, Isshiki, Hayama-machi Kanagawa-ken, Japan

[*] Notice: The portion of the term of this patent subsequent to Feb. 5, 1991 has been disclaimed.

[21] Appl. No.: 91,651

[22] Filed: Nov. 5, 1979

Related U.S. Application Data

[60] Division of Ser. No. 841,979, Oct. 13, 1977, abandoned, which is a continuation of Ser. No. 610,871, Sep. 8, 1975, abandoned, which is a division of Ser. No. 416,237, Nov. 15, 1973, abandoned, which is a division of Ser. No. 131,782, Apr. 6, 1971, Pat. No. 3,790,105, which is a continuation-in-part of Ser. No. 782,349, Dec. 9, 1968, abandoned, which is a continuation-in-part of Ser. No. 551,023, May 18, 1966, abandoned, and Ser. No. 328,395, Dec. 5, 1963, Pat. No. 3,320,898.

[51] Int. Cl.⁴ ............................................. B64D 35/02
[52] U.S. Cl. ..................................................... 244/60
[58] Field of Search ......... 244/121, 53 R, 60, DIG. 3; 418/22-23, 210, 212; 60/486, 428, 484, 494; 180/6.48; 91/492

[56] References Cited

U.S. PATENT DOCUMENTS

| | | | |
|---|---|---|---|
| 1,354,777 | 10/1920 | Rock | 60/494 |
| 1,876,833 | 9/1932 | Benedek | 91/492 |
| 1,939,156 | 12/1933 | Wright | 244/60 |
| 2,446,242 | 8/1948 | Orshansky | 180/6.48 |
| 2,804,016 | 8/1957 | Moore | 60/428 |
| 3,065,700 | 11/1962 | Blenkle | 180/6.48 |
| 3,242,870 | 3/1966 | Bush | 91/492 |
| 3,357,362 | 12/1967 | Orr | 91/492 |

Primary Examiner—Galen L. Barefoot

[57] ABSTRACT

A hydraulic fluid driving arrangement for land, water or air vehicles includes rotary hydraulic motors driving respective propellers. The motors are arranged in pairs, with the two motors of each pair being on respective opposite sides of the longitudinal axis of the vehicle. One or more hydraulic pump is driven by a prime mover and deliver hydraulic fluid under pressure to two or more separate outlets, with the flows in all outlets being either proportionate or equal to each other, and the outlets being completely separate from each other. One outlet supplies fluid to the motors on one side of the vehicle's medial plane of symmetry and the other supplies fluid to the motors on the other side of the vehicle's medial plane. Respective flow adjustment means may operably associated with each outlet, and may be operated either independently or conjointly. Alternatively, control of the motor speeds may be provided by bypasses. Two or more outputs of the hydraulic pumps may be combined to supply two or more motor supply lines with equal or proportionate flows, with check valves being provided to prevent reverse flow.

1 Claim, 7 Drawing Figures

HYDRAULICALLY CONTROLLED, FLUID-STREAM DRIVEN VEHICLE

CROSS-REFERENCE TO RELATED APPLICATIONS

This is a divisional application of my co-pending patent application Ser. No. 841,979; filed Oct. 13, 1977, now abandoned. Application 841,979 is a CFR 1.60 continuation application of application Ser. No. 610,871, filed on Sept. 8, 1975, which is now abandoned. Application Ser. No. 610,871 was a divisional patent application of my earlier patent application Ser. No. 416,237, filed on Nov. 15, 1973, now abandoned. Application Ser. No. 416,237 was a divisional application of my still earlier patent application Ser. No. 131,782 which was filed on Apr. 6, 1971 and which is now U.S. Pat. No. 3,790,105, which issued on Feb. 5, 1974. Application Ser. No. 131,782 was a continuation in part of the still earlier application Ser. No. 782,349 which was filed on Dec. 9, 1968 and which is now abandoned. Application Ser. No. 782,349 was a continuation in part application of the still earlier patent applications Ser. Nos. 328,395 of Dec. 5, 1963 and a Ser. No. 551,023 of May 18, 1966 which is now abandoned, while the mentioned application Ser. No. 328,395 is now U.S. Pat. No. 3,320,898, which issued on May 23, 1967.

Priorities of the above mentioned earlier applications are claimed for this present application at least in part.

SUMMARY OF THE INVENTION

This invention relates to fluid stream operated vehicles, such as vehicles supported or driven by rotating propellers, and, more particularly, to novel, simplified and improved hydraulic driving and control means for such vehicles.

In accordance with the invention, hydraulic fluid operated motors, driving propellers, are arranged in pairs, with the motors of each pair being arranged symmetrically on respective opposite sides of the longitudinal axis of the vehicle, and being of substantially equal rating. The motors are of a type known as positive displacement hydraulic fluid operated motors for revolving rotary members, such as propellers. Hydraulic fluid flow producing means, such as hydraulic fluid pumps driven by internal combustion engines or the like, are provided on the vehicle, and each fluid flow producing means has a pair of outputs whose fluid flows are substantially equal or proportionate to each other. One hydraulic fluid output of each fluid flow producing means is supplied to the positive displacement hydraulic motor or motors on one side of the vehicles longitudinal axis, and the other hydraulic fluid output of each fluid flow producing means is supplied to the propeller driving motors on the opposite side of the longitudinal axis of the vehicle.

Where more than one positive displacement hydraulic motor is provided on each side of the vehicle, the motors on each side may be supplied with hydraulic fluid in a parallel connection. In addition, bypass means may be provided between each hydraulic fluid supply line and the associated return line in order to adjust the relative rates of operation of the motors on opposite sides of the vehicle axis, in order to effect a turning movement or the like. Alternatively, means may be provided to supply an additional fluid flow to the motor or motors on one side of the vehicle axis in order to accelerate the same relative to the motor or motors on the other side of the vehicle axis, or vice versa.

The control and driving means of the invention is applicable to airborne vehicles, to waterborne vehicles, or to land vehicles such as wheelborne vehicles or vehicles operating on runners or the like.

The outstanding feature of the invention hydraulic drive and control means is the stability of attitude of the vehicles to which the driving and control means are applied, as well as a great reduction in cost of the vehicles. The vehicles are simple, easy to control, and free of the usual disturbances attendant upon mechanical driving means.

An object of the invention is to provide inexpensive and simple hydraulic drive and control arrangements for fluid stream driven vehicles.

Another object of the invention is to provide such arrangements including positive displacement rotary fluid motors arranged in pairs and each driving a propeller or the like, with the motors of each pair being disposed at equal distances on opposite sides of the longitudinal axis of the vehicle, and with the motors of each pair being supplied, from a fluid flow producing means, with constantly proportional or equal fluid flows.

For an understanding of the principles of the invention, reference is made to the following description of typical embodiments thereof as illustrated in the accompanying drawings.

DESCRIPTION OF THE PREFERRED EMBODIMENT

Figure 1:
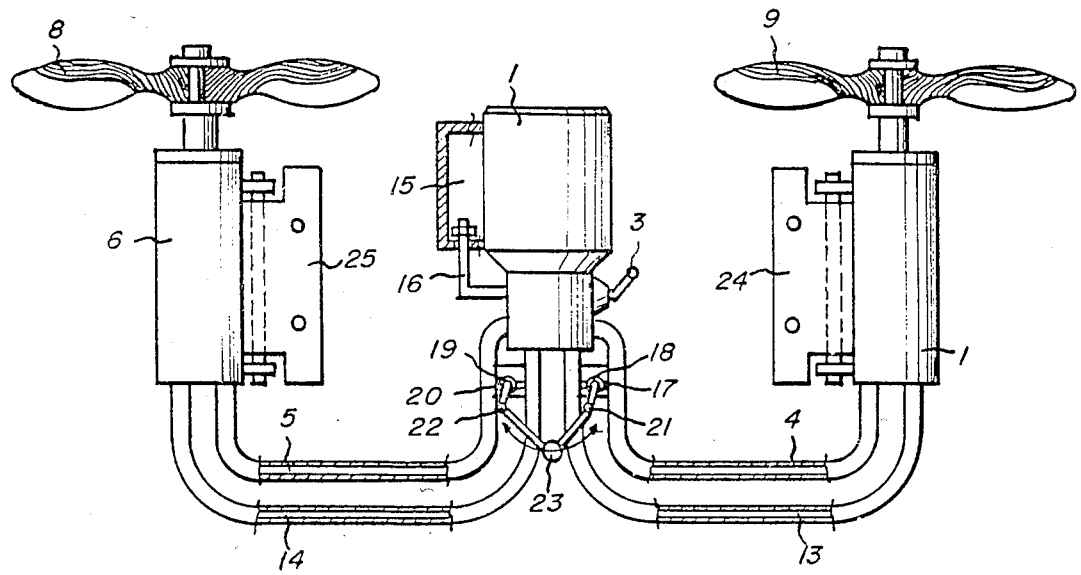
FIG. 1 is an elevation view, partly in section, of a hydraulic control and driving arrangement embodying the invention, and which can be mounted on any suitable type of vehicle.

The hydraulic driving and control arrangement illustrated in FIG. 1 is a unit which can be mounted on any type of vehicle. This unit includes a power plant driving fluid flow producing means 1 having outputs with proportional or equal delivery rates, connected to respective supply lines 4 and 5 which deliver working hydraulic fluid to respective positive displacement fluid motors 6 and 7 at proportionate or equal flow rates. Respective return lines 14 and 13 connect motors 6 and 7 to fluid flow producing means 1, which may withdraw fluid from tank or reservoir 15 through line 16 and which is preferably provided with a fluid flow adjusting means 3 effective to control the displacement value of the displacement chambers therein in proportion to each other. Control adjustment means 3 thus assures that, at all times, hydraulic working fluid is supplied to the motors 6 and 7, driving propellers 8 and 9, at equal or proportionate rates of flow and in supply lines which are separate from each other.

Respective bypass lines 17 and 19, each including a respective control means 18 and 20, interconnect respective supply lines 4 and 5 to respective return lines 13 and 14. Bypass lines 17 and 19 have a very small cross-sectional area, compared to those of supply lines 4 and 5, and thus allow bypassing only a small proportion or fraction of the working fluid. Control means 18 and 20 may be operated separately or may be conjointly operated through connection means 21 and 22 connected to a combined operating means 23. By using means or handle 23, it is possible to change the relative angular velocities of propellers 8 and 9 by operating only a single control handle.

The unit shown in FIG. 1 is transportable and may be mounted on any kind of vehicle by the adapting means 24 and 25, with the mounting on the vehicle being effected in a manner such that motors 6 and 7 are located symmetrically on opposite sides of the vehicle longitudinal axis. By virtue of a pivoting arrangement provided between each adapting member and the associate motor, the motors 6 and 7 can be swung into or out of the vehicle.

Figure 2:
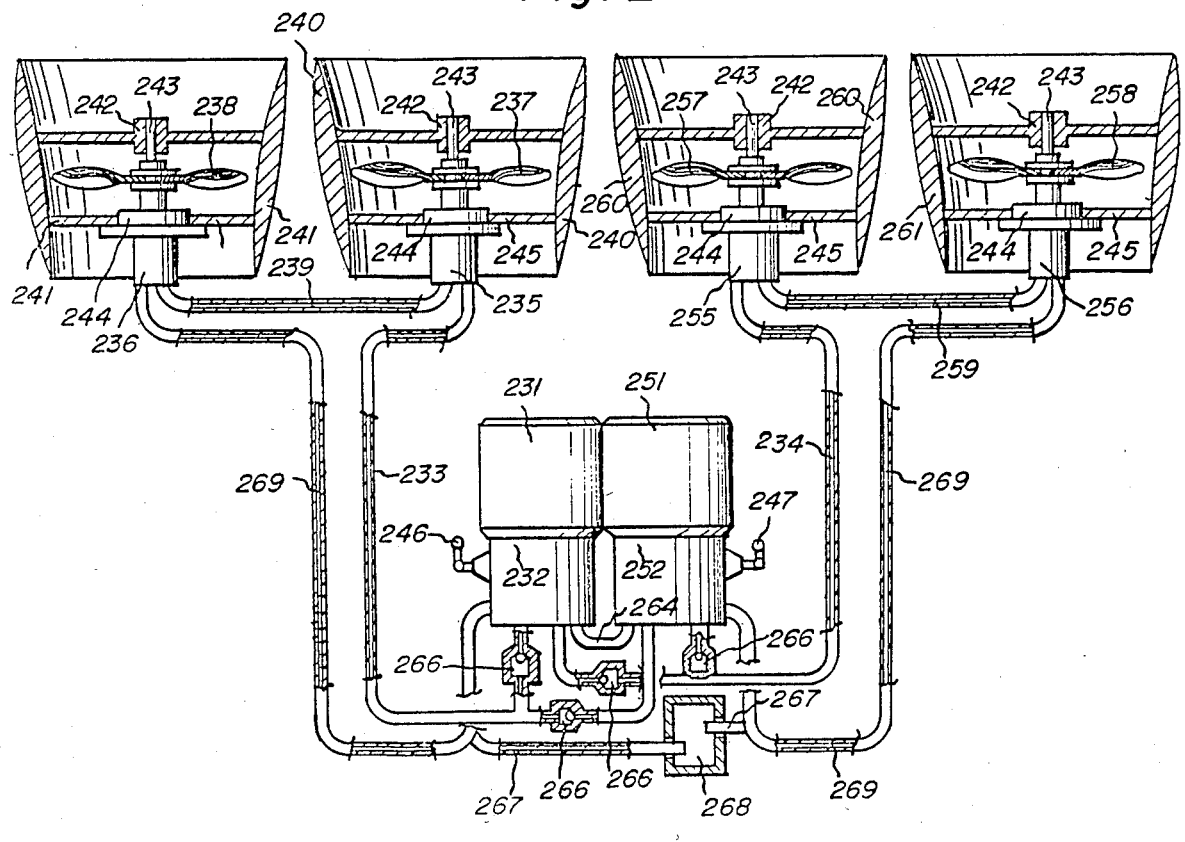
FIG. 2 is a view, similar to FIG. 1 of another embodiment of the hydraulic control and driving means of the invention, and which also can be mounted on any suitable type of vehicle.

In the self-contained unit shown in FIG. 2, two fluid flow producing means 232 and 252, driven by respective power plants 231 and 251, supply two pairs of positive displacement rotary fluid motors 235, 236 and 255, 256, each driving a respective propeller 237, 237 and 257, 258. Each fluid flow producing means has two separate outputs having proportionate or equal rates of flow of working fluid. The inlets of fluid flow producing means 232 and 252 may be connected either separately or conjointly to a tank or reservoir 268.

A supply line 233 extends from one output of fluid flow producing means 232 to an inlet of fluid motor 235, and the outlet of fluid motor 235 is connected to the inlet of fluid motor 236 by a line 239. The outlet of motor 236 is connected by a return line 269 either to a fluid flow producing means or to tank 268. Thus, motors 235 and 236 receive the same flow of working fluid and are connected in series with each other. The other outlet of fluid flow producing means 232 is connected by a supply line 234 to the inlet of rotary fluid motor 255, and a line 259 connects the outlet of rotary fluid motor 255 to the inlet of rotary fluid motor 256. A return line 269 connects the outlet of motor 256 to either a fluid flow producing means or to tank 268. Thus, motors 255 and 256 are connected in series with each other and receive the same flow of fluid therethrough.

Each pair of series connected motors thus receives a separate fluid flow, and the two fluid flows have proportionate or equal flow rates. Due to the equal or proportionate angular velocities of the four fluid motors, the respective propellers are driven at equal or proportionate angular velocity to provide fluid streams of substantially equal thrusts.

It will be noted that one output of fluid flow producing means 232 is connected to supply line 233 by a checkvalve means 266, and correspondingly one output of fluid flow means 252 is connected to supply line 233 through a checkvalve means 266 whereby first outputs of both fluid flow producing means are combined into a single first flow of working fluid in supply line 233. The second output of fluid flow producing means 232 is connected through a checkvalve means 266 to supply line 234, to which the second output of fluid flow producing means 252 is also connected through a checkvalve means 266, the two second outputs thus being combined into a single flow through supply line 234.

Thus, if either one of the fluid flow producing means 232, 252, or either one of the respective power plants 231, 251, fails, the other fluid flow producing means would still deliver two outputs, one to supply line 233 and the other to supply line 234. The checkvalve means prevent backflow of fluid in the event of failure of one or the other of either the fluid flow producing means or the associated power means.

Return lines 269 return the working fluid directly or indirectly into tank 268, although a cooling means may be interposed in advance of this tank. The return lines may be connected to the common intermediate line 264, which could also be a drain line. Lines 267 represent suction lines leading from tank 68 to the fluid flow producing means 232 and 252.

Additionally, each fluid flow producing means preferably is provided with a respective fluid flow adjusting means 246, 247 operable to change the effective displacement of the pumping chambers in the fluid flow producing means, between a minimum and a maximum value, and vice versa, and, during operation of the fluid flow producing means, to adjust proportionatel the two outputs of each fluid flow producing means. These adjusting means may be individually operated or they may be operated by a combined operating member.

A feature of the embodiment of the invention shown in FIG. 2 is that the propellers are mounted in respective ducts 240, 241 and 260, 261 having axial cross-sections such that the ducts can act somewhat in the nature of lift devices, which greatly increases the thrusts due to the rotating propellers. The several motors are mounted in the ducts by virtue of respective flange means 244 secured to respective support members 245, and the output shaft of each motor, connected to the associated propeller, is supported in a respective bearing means 243 of a support 242 extending transversely of the associated ducts. This enclosing of the propellers and their driving motors in the ducts has an advantage from the safety standpoint in that the propellers are protected from contact with persons or animals. In the same manner as in the embodiment of FIG. 1, the unit of FIG. 2 may be mounted on any type vehicle.

Figure 7:
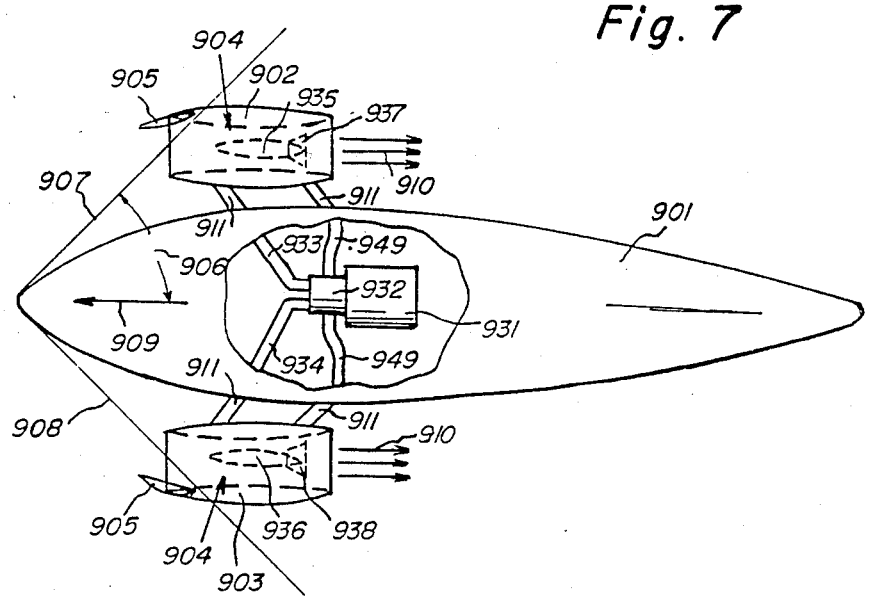
FIG. 7 is a top plan view of a waterborne vehicle embodying the hydraulic control and driving means of the invention.

The waterborne vehicle shown in FIG. 7 has a body 501 which may have a freight or passenger compartment 502, and which mounts a power plant 531 driving a fluid flow producing means 532 having two outputs of equal or proportionate fluid flow rates. Means 532 may be either a constant or a variable delivery means but, in either event, produces two separated flows of equal or proportionate flow rates or velocities. The velocity of the two fluid flows may be controlled by variation in the speed of means 531, or fluid flow producing means 532 may be provided.

Figure 3:
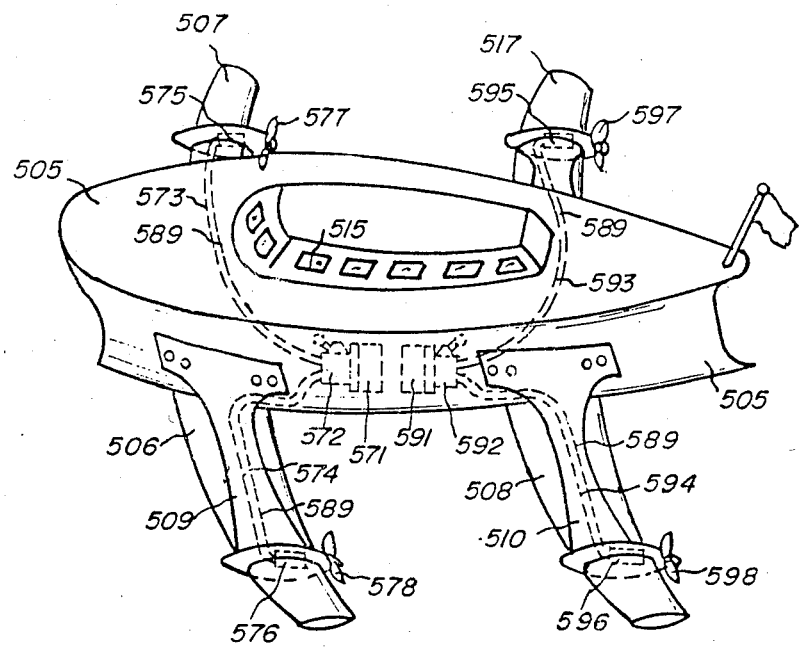
FIG. 3 is a perspective view of a waterborne hydrofoil vehicle embodying the hydraulic control and driving means of the invention.

The waterborne vehicle illustrated in FIG. 3, includes hydrofoils or wings 506, 507, 508 and 517 arranged in pairs with the wings of each pair on opposite sides of body 505 which may include a passenger or freight compartment 515. Body 505 carries a drive means 571 and 591 driving respective fluid flow producing means 572 and 592, each drive means and its associated fluid flow producing means preferably being mounted as low as possible on body 509 to insist in maintaining stability of the vehicle. Each fluid flow producing means provides two separated outputs of equal or proportionate working fluid flow velocity, with the two flows being completely separate from each other. The hydrofoils are braced from body 505 by suitable supporting struts 509 and 510.

The respective outputs of fluid flow producing means 572 are connected, through respective supply lines 573 and 574 to respective positive displacement rotary fluid motors 575 and 576 driving respective propellers 577 and 578, the fluid flow being returned through respective return lines 589. Similarly, the respective outputs of means 592 are connected by respective supply lines 593 and 594 to respective positive displacement rotary fluid motors 595 and 596 driving respective propellers 597 and 598, with the working fluid being returned through respective return lines 589. The motors are mounted on respective hydrofoils, and are arranged symmetrically with respect to the longitudinal center line of body 505. Additionally, the motors preferably are equal in size, as are also the respective propellers, so that the thrusts provided by the four motors are substantially equal to each other.

If both power plants and their fluid flow producing means are operating, equal flows of working fluid are delivered to all the motors for driving all the propellers at substantially equal angular velocities. The resultant thrusts are sufficiently strong, upon an increase in the angular velocities of the propellers, that body 505 is lifted out of the water and is supportes substantially entirely by the wings or hydrofoils. The symmetrical motor arrangement provides for driving the vehicle stably in a forward direction, with the thrust forces being in equilibrium with the resistant forces acting on the hydrofoils. This assures stability of movement of the vehicle and easy control thereof and, at the same time, the vehicle is simple and relatively inexpensive to construct and the relatively small rotary fluid motors offer little resistance to vehicle movement.

While only one fluid flow producing means and its associated drive could be provided to operate either pair of rotary fluid motors, each mounted on a respective hydrofoil, the vehicle preferably is provided with two sets of motors each mounted on a respective hydrofoil. The fluid flow producing means can be either variable or constant flow means and, in the event that they are variable flow means, fluid flow adjusting means are provided for each producing means. Alternatively, the outputs can be varied by controlling the speed of the driving means 571 and 591.

Figure 4:
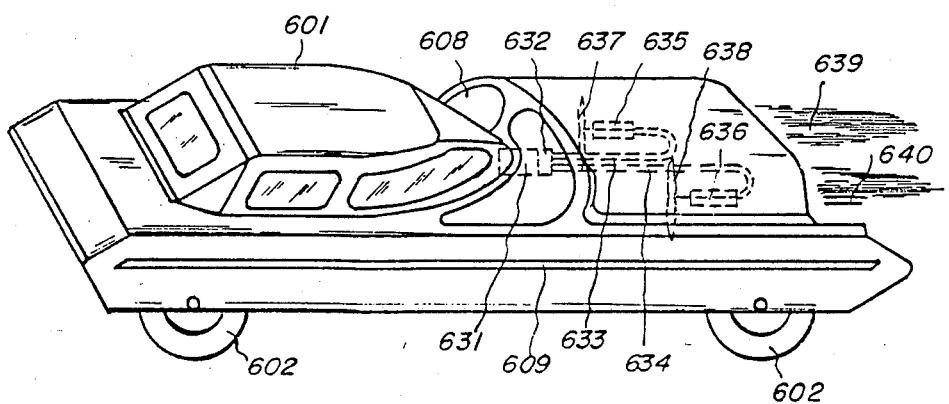
FIG. 4 is a perspective view of a wheeled land vehicle embodying the hydraulic control and driving means of the invention.

The land vehicle illustrated in FIG. 4 has a body 601 supported on wheels or rollers 602, and the body supports a power plant 631 driving a fluid flow producing means 632 having two or more entirely separated outputs providing working fluid flows of equal or proportionate velocity. The respective two outputs of fluid flow producing means 632 are connected, by respective supply lines 633 and 634 to respective positive displacement fluid flow motors 635 and 636, with the working fluid being returned through respective return lines. Motors 635 and 636 drive respective propellers 637 and 638, so that, with equal or proportional flows of working fluids to both motors, these propellers produce equal or proportionate air flows, and preferably air flows which are equal in flow rate. The propellers and associated motors are symmetrically arranged on opposite sides of the longitudinal center line of the vehicle, so that the vehicle is driven stably, either forwardly or backwardly, by the reaction forces from fluid streams 639 and 640. For protective purposes, propellers 637 and 638 are disposed in respective ducts 608 and 609.

The speed of the vehicle can be controlled by varying, in a porportionate or equal manner, the rate of delivery of working fluid to the two motors, and such variation can be effected either by a suitable flow adjustment device or by varying the speed of power plant 631. In the manner described for other embodiments, bypass means or additional fluid flow control means can be provided to effect a differential between the thrusts 639 and 640 to effect a selected turning movement of the vehicle.

Figure 5:
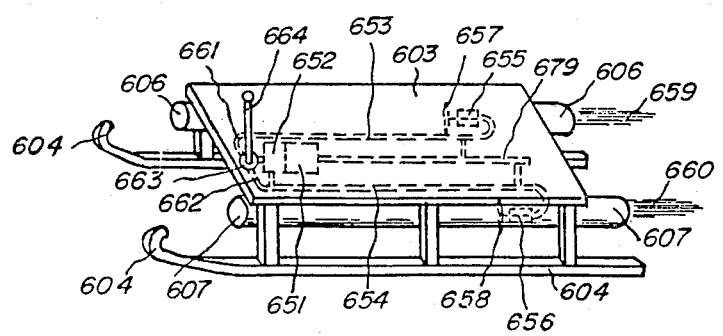
FIG. 5 is a perspective view of a sled embodying the hydraulic control and driving means of the invention.

FIG. 5 illustrates a fluid stream driven sled including a body 603 supported on runners 604 and having connected thereto ducts or tubes 606 and 607. Duct 605 contains one or more positive displacement rotary fluid motors 655, and duct 607 contains one or more positive displacement rotary fluid motors 656. Revolving members or propellers 657, 657, driven by respective fluid motors 655, 656, create fluid streams inside the respective ducts 606, 607, and these fluid streams are shown at 659 and 660. The working fluid for the motors is provided by a fluid flow producing means 652 driven by a power plant 651, and having two outputs providing proportionate or equal rates of flow of the working fluid. The outputs of means 652 are connected through respective delivery lines 653 and 654 to the respective motors 655 and 656, to drive these motors and the associated propellers, and the fluid is returned by return lines 679 directly or indirectly into the fluid flow producing means, so that the vehicle is driven by the reaction forces of air streams 659 and 660. The straightness and stability of movement of sled 603 is assured due to the equilibrium of the thrust forces and the resisting forces.

The ducts containing the rotary fluid motors are mounted symmetrically on opposite sides of the longitudinal center line of the vehicle and, as the relatively wide lateral spacing of the two fluid streams increases the stability of movement of the sled, very simple steering means can be provided in the form of a bypass control means 664 included in a bypass line 661. By operation of control means 664, it is possible to create a differential between the thrusts 659 and 650, resulting in steering of the sled in a selected direction.

Alternatively, instead of providing this bypass means, it is also possible to provide an additional fluid flow producing means for supplying additional working fluid to a selected one of the two supply lines in accordance with the desired direction of turning movement of the sled. This additional fluid flow could be directed by a control means 663 into either supply line 661 or 662. Such a control by supplying an additional fluid is also applicable to the other embodiments of this invention.

Figure 6:
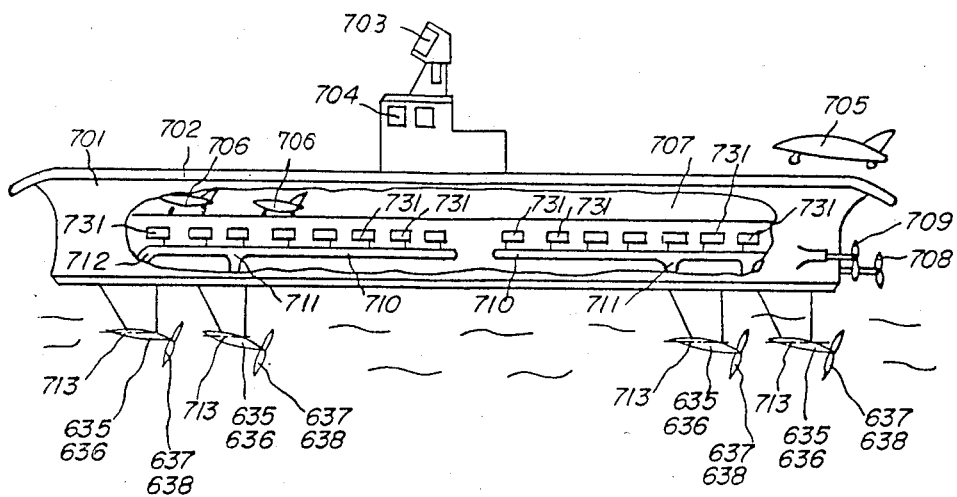
FIG. 6 is a side elevation view, partly broken away, of a large waterborne vessel embodying the hydraulic control and driving means of the invention.

The very large waterborne vessel shown in FIG. 6 is a hydrofoil vessel including a body 701 which may be utilized for passengers or cargo, or which may be the body of an aircraft carrier, and a control tower 704 is mounted on the upper deck and has airspace control means 703 mounted thereon. The upper deck may be designed, for example, for the landing or take-off of aircraft, and aircraft or other cargo may be stored in the spaces 706 and 707 below the upper deck.

The vehicle is provided with a plurality of hydrofoils or wings 713 each having mounted thereon a pair of positive displacement rotary fluid motors 635 and 636 driving respective propellers 637 and 638, the motors of each pair being disposed symmetrically on opposite sides of the longitudinal center line of the vehicle. In order to drive the propellers at sufficiently high angular velocities to move the vessel through the water at a rate sufficiently high that it will rise on hydrofoils 713, a plurality of power plants and associated fluid flow producing means driven thereby are provided, as indicated at 731, and each fluid flow producing means has a pair of separate outputs providing proportionate or equal rates of flow of working fluid. The fluid flow producing means are arranged in two groups, each including a pair of common supply lines 710 each connected to a respective different output of the fluid flow producing means of the respective group. These are thus for common supply lines 710, two connected to the rearward motors 635, 636, and two connected to the forward motor 635 and 636. The forward common supply lines 710 branch into supply lines 711 and 712, as do also the rearward common supply lines 710. Consequently, substantially equal thrusts are provided by all of the propellers 637, 638, which assures stability of movement and attitude of the vehicle by assuring equilibrium between the thrust forces and the movement resisting forces. During such times as the vessel may not be operated at high speed, or at a speed sufficiently high to rise on the hydrofoils, one or more of the fluid flows can be directed into fluid flow motors driving conventional propellers 708 and 709.

FIG. 7 illustrates a water-borne vehicle.

During movement of this vehicle, a pair of headwaves 907, 908, at an inclination 906 relative to the direction of movement 909 of body 901, is created, and these headwaves are under a higher static pressure and raise the surface of the water in their areas. In accordance with the invention, a pair of fluid flow creating means 937 and 938, providing two or more fluid streams 910, are positioned symmetrically on opposite sides of the bow of body 901, so that headwaves 907 and 908 can enter into the suction or intake area 905 of these fluid flow creating means. The intake areas 905 may comprise guide vanes or the like, in order to change the direction of movement of the headwaves contrary to the motion 909 of body 901. This results in an increase in the thrust for driving the vehicle forwardly and thus in an increase in the velocity of the vehicle. The power supply unit for the fluid flow creating means 937 and 938 may be of a conventional type or may be the hydraulic control and driving means of the present invention.

By way of example, a power plant 931 may drive the fluid flow producing means 952 having plural separate fluid outputs 933 and 934 providing proportionate or equal rates of flow of working hydraulic fluid. One output is delivered to fluid motor 935 and the other to fluid motor 936, each operating a respective propulsion member 937, 938 so that the fluid streams 910 have proportionate or equal rates of flow. The return fluid flow occurs directly or indirectly through fluid flow lines 949.

While specific embodiments of the invention have been shown and described in detail to illustrate the application of the principles of the invention, it wilkl be understood that the invention may be embodied otherwise without departing from such principles.

The specification and the figures show at some occasions means to control the rotary velocity of the motors, flow delivery quanity or means for running the vehicle in a courve.

These means may be added to the vehicle if so desired.

The application intends to patent however primarily the straight forward motion of the vehicle under equal thrusts produced by equally acting fluid stream creating means on opposite side of the longitudinal vertical plane of symmetry of the vehicle, whereby said equalness of action of the fluid stream creating means is enforced by driving fluid motors which in turn are forced to run with equal, but if desired opposite, rotary velocity by the supply of equal rates of flow of hydraulic pressure fluid to them in separated and to each other parallel fluid lines. The fluid lines receive their equal rate of flow of hydraulic fluid by equally acting displacement members in a fluid flow producing device which supplies a plurality of flows of equal rate of fluid and which thereby divides the power which drives the fluid flow producing means into equal rates of plural power portions.

The patent is however desired for open flow circuits too, where the fluid flow producing means suctions fluid out of a tank. In my co-running U.S. Pat. No. 3,790,105 the fluid flow drive is operated in a closed cycle, which means, that the return flows are led to the fluid flow producing means, whereby the fluid tank was eliminated.

The difference between my co-running U.S. Pat. No. 3,790,105 and this present application exists thereby therein, that U.S. Pat. No. 3,790,105 is for a closed circuit, while the present application is for an open fluid circuit, which suctions fluid into the fluid flow producing or pump means out of a fluid tank.

That additional means for running the vehicle in a courve or to control the forward speed of the vehicle by adjusting the rate of flow of fluid in the fluid lines may be added to the vehicle of the invention, is mentioned in the specification, but they are not content of the guiding independent claim of this present patent application.

This patent application, shall obtain a patent, which will run at an equal time intervall as my co-running U.S. Pat. No. 3,790,105 and shall cease to be a protecting patent, when the life of my co-running U.S. Pat. No. 3,790,105 ceases to have life or power, or ceases to exist as patent. A respective Terminal disclaimer has been filed together with this present patent application.

This application shall however patent the vehicle regardless, whether the vehicle runs on ground, on water or flies through air. It is important in this respect, that the fluid drive, which is a positive displacement hydraulic fluid drive or transmission, must be of little weight and of very high efficiency, when the vehicle flies through air. It is further required, that the means, which produce the separated flows of relatively to each other equal rate of flow must be able to obtain and maintain said equalness of rate of flow.

Thus, hydraulic devices of the past, which failed to give enough fluid power in a little enough weight, or which failed to gurantee the maintenance of equalness of rate of flow, or which failed to transform the power into fluid drive power with a good enough total efficiency can not be used in this invention, when the aims of this invention shall be materialized.

It is therefore important at reading this specification, to recognize, that this application derives from many earlier applications, which in detail describe such less-weight, high efficient fluid flow producing devices for the creation of equal rates of flow in separated fluid lines. In the figures of the present application only the outer forms of the fluid flow producing means are shown or sketched. That indicates however, that in the eldest of the prior application, namely in application Ser. No. 328,395 of Dec. 5, 1963 such fluid flow producing means, as applicable in the invention is described in detail and can be seen in the U.S. Pat. No. 3,320,898, which matured out of the said application. Other suitable hydraulic devices are for example shown in my U.S. Pat. No. 4,171,784 of Oct. 10, 1979 and in patents, which can be found in my book "Mini-Intriduction to a New Technology" of Rotary Engine Kenkyusho, 2420 Isshiki, Hayama-machi, Kanagawa-ken, Japan. Suitable power plants are also shown in the mentioned U.S. Pat. No. 3,320,898 and in the mentioned book.

The power plants and the hydraulic devices of this application are commercially available now, for example from Rotary Engine Kenkyusho, 2420 Isshiki, Hayama-machi, Kanagawa-ken.

Thus, the patent application does not only provide an idea for a vehicle, but guarantees the proper functioning with commercially available components, which were not available and which did not exist in theories before my earliest priority application, which is effective to this present application. Thus, the creation of the components to materialize the vehicle of the application in the earlier applications, which form the priority of this application, is a portion of this present application.

What is claimed is:

1. A fluid stream driven vehicle comprising, in combination, a body having a longitudinal plane of substantial symmetry; at least one pair of hydraulic fluid operated motors on said body, with the motors of each pair being arranged symmetrically on opposite sides of said plane; respective fluid stream creating driving means driven by each motor; a fluid tank; at least one hydraulic fluid flow producing means communicated to said fluid tank; said fluid flow producing means including a plurality of separated working chamber groups of a plurality of commonly acting chambers and displacement means in each of said groups and said fluid flow producing means producing at least one pair of separated and independent output flows of hydraulic fluid under pressure, with the rates of flow of the at least two output flows being constantly equal to each other; separate and independent supply lines delivering one flow directly to at least one motor on one side of the vehicle's body and the other flow directly to at least one motor on the opposite side of the vehicle's body; the number of motors supplied by each flow being equal to that supplied by the other flow; and respective return lines connecting each motor to said fluid tank; whereby the fluid stream creating means on opposite sides of said plane are driven at equal velocities to produce equal thrusts on both sides of said axis for stabilizing the direction of movement and the attitude of said vehicle.

* * * * *